United States Patent [19]

Masuo et al.

[11] Patent Number: 5,155,855
[45] Date of Patent: Oct. 13, 1992

[54] MULTI-CPU SYSTEM USING COMMON MEMORY AND HAVING ACCESS MEDIATION LATCH

[75] Inventors: Yasuo Masuo; Masayuki Iwatsuka, both of Osaka, Japan

[73] Assignee: Matsushita Electric Works, Ltd., Osaka, Japan

[21] Appl. No.: 262,908

[22] Filed: Oct. 26, 1988

[30] Foreign Application Priority Data

Oct. 26, 1987 [JP] Japan .................. 62-269574
Jun. 27, 1988 [JP] Japan .................. 63-158840

[51] Int. Cl.$^5$ .......................................... G06F 13/14
[52] U.S. Cl. ......................... 395/72.5; 364/239; 364/242.6; 364/242.93; 364/228.1; 364/DIG. 1; 395/325
[58] Field of Search ... 364/200 MS File, 900 MS File, 364/DIG. 1; 395/725, 325

[56] References Cited

U.S. PATENT DOCUMENTS

| | | | |
|---|---|---|---|
| 4,395,753 | 7/1983 | Comfort | 364/200 |
| 4,415,972 | 11/1983 | Adcock | 364/200 |
| 4,594,657 | 6/1986 | Byrns | 364/900 |
| 4,611,275 | 9/1986 | Garnier | 364/200 |
| 4,631,667 | 12/1986 | Zulian | 364/200 |
| 4,633,392 | 12/1986 | Vincent | 364/200 |
| 4,639,861 | 1/1987 | Appiano | 364/200 |
| 4,641,238 | 2/1987 | Kneib | 364/200 |
| 4,698,753 | 10/1987 | Hubbins | 364/200 |
| 4,722,048 | 1/1988 | Hirsch | 364/200 |
| 4,761,735 | 8/1988 | Amy | 364/200 |
| 4,780,822 | 10/1988 | Miller | 364/200 |
| 4,797,815 | 1/1989 | Moore | 364/200 |
| 4,805,106 | 2/1989 | Pfeifer | 364/200 |
| 4,862,348 | 8/1989 | Nakamura | 364/200 |
| 4,866,664 | 9/1989 | Burkhardt | 364/900 |
| 4,872,108 | 10/1989 | Bussonniere | 364/200 |

FOREIGN PATENT DOCUMENTS

WO8600734 1/1986 PCT Int'l Appl. .

OTHER PUBLICATIONS

IBM Technical Disclosure Bulletin, vol. 30 No. 5 Oct. 1987 pp. 163-172.
Electronics, vol. 49, No. 20, Sep. 30, 1976, pp. 89-90, New York, US J. Edrington: "Buffer Speeds Response Time of First-In First-Out Memory."
Patent Abstracts of Japan, vol. 5, No. 201 (P-94) [873], Dec. 19, 1981; & JP-A-56-123 047 (Mitsubishi Denki K.K.), Sep. 26, 1981.
Microelectronics Journal, vol. 16, No. 3, May-Jun. 1985, pp. 5-12, Benn Electronics Publications Ltd., Luton Beds, GB: D. R. Gonzales: "Interfacing Multi--Processors Using Devices with Dual-Port RAM".

Primary Examiner—David Y. Eng
Assistant Examiner—Eric Coleman
Attorney, Agent, or Firm—Sughrue, Mion, Zinn, Macpeak & Seas

[57] ABSTRACT

A multi-CPU system comprises between a CPU without a control terminal and a common memory: an access mediation latch for temporarily latching data information to be transferred and corresponding address information; and a timing control circuit for controlling the timing of data transfer between the access mediation latch and the common memory in accordance with a mediation signal outputted from a contention mediation terminal of the common memory.

4 Claims, 11 Drawing Sheets

FIG. 1

FIG. 4(a) Ad 
FIG. 4(b) $\overline{CS}$ 
FIG. 4(c) $\overline{RD}$ 
FIG. 4(d) DB 
FIG. 4(e) $\overline{CORD}$ 
FIG. 4(f) CORW 
FIG. 4(g) $\overline{DRD}$ ($\overline{OE_1}$) 
FIG. 4(h) $DB_1$ 
FIG. 4(i) INTERNAL DATA OF D-FF6 
FIG. 4(j) $Ad_1$ 
FIG. 4(k) $\overline{CS_1}$ 
FIG. 4(l) $\overline{Busy_2}$

MULTI-CPU SYSTEM USING COMMON MEMORY AND HAVING ACCESS MEDIATION LATCH

BACKGROUND OF THE INVENTION

The present invention relates to a multi-CPU (Central Processing Unit) system with a common memory in which, in using the common memory data information is transferred between plural CPUs. More particularly, it relates to control of the common memory.

A multi-CPU system in which, in using a common memory, data information is mutually transferred between plural CPUs is well known in the prior art technology. Two typical examples are disclosed in Japanese Patent Application Laid-Open No. 243763/1985 and Japanese Patent Application Laid-Open No. 245063/1985.

Figure 10:
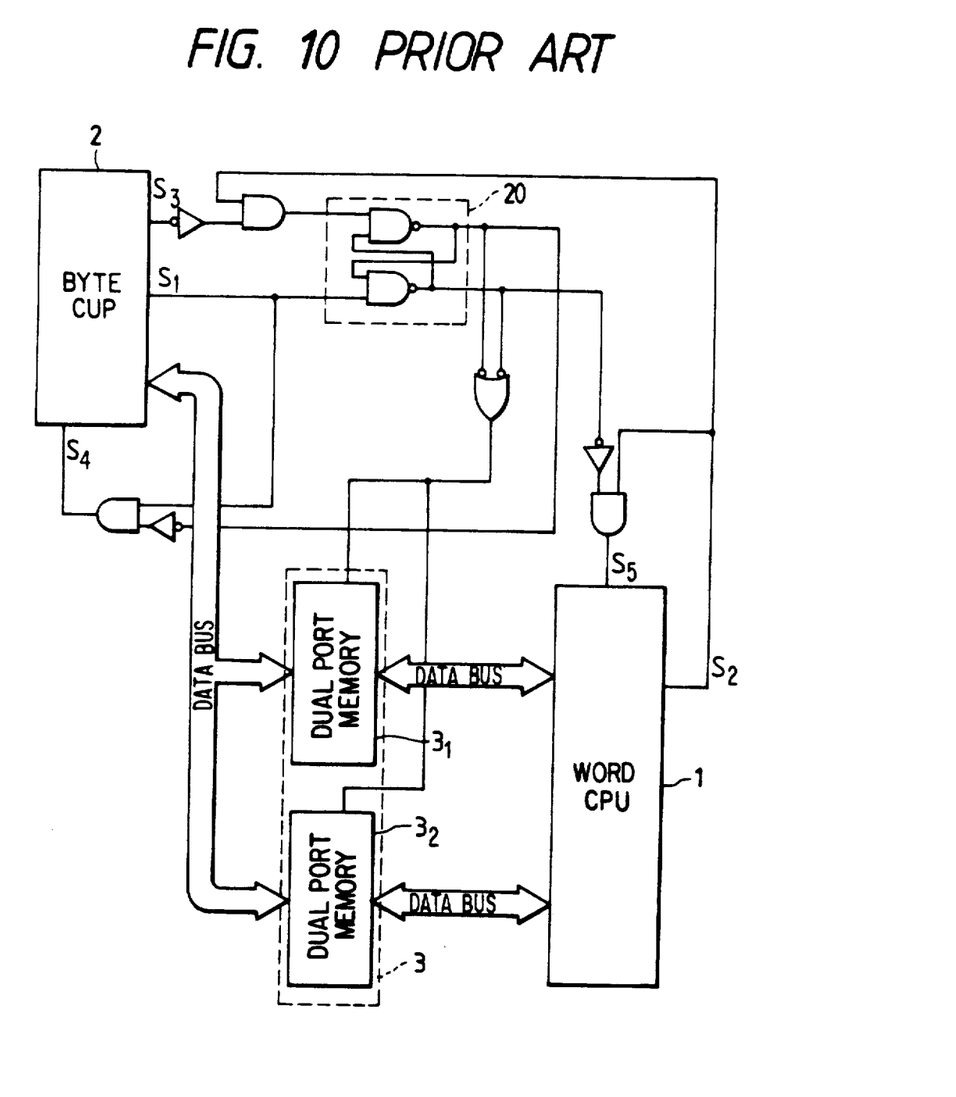
FIG. 10 a circuit of a conventional multi-CPU system.

In FIG. 10, the multi-CPU system disclosed in the Japanese Patent Application Laid-Open No. 243763/1985 is illustrated. In this system, data information is mutually transferred between a word CPU 1 which accesses a common memory 3 with one word length unit and a byte CPU 2 which accesses the same common memory 3 with one byte length unit. The length of one byte is equal to one half of the length of one word. The common memory 3 comprises two dual port memories $3_1$ and $3_2$, each storing data information of one byte. In this multi-CPU system, when data information of one word length is written into the common memory 3 from the byte CPU 2, the first one byte of the data information of one word length is stored in one of the dual port memories, for example $3_1$, and then the second one byte of the data information is stored in the other dual port memory $3_2$. However, during these two processes of operation, contention of access may happen when the word CPU 1 accesses the common memory 3 while the byte CPU 2 continues writing the second one byte of the data information into the same address. This contention of access may destroy the data information of one word to be inputted to the common memory 3 from the byte CPU 2 or may causes the word CPU 1 to read incorrect data information with renewed data of only one byte. On the contrary, when data information of one word is read from the common memory 3 to the byte CPU 2, the first one byte of the data information of one word is read out firstly, and then the second one byte of the data information is read out. In this case too, during these two processes of operation, contention of access may happen when the word CPU 1 writes new data information into the common memory 3 while the byte CPU 2 continues reading the second one byte of the data information from the same address. This contention of access may destroy the data information to be outputted from the common memory 3 to the byte CPU 2.

Considering these facts, in this prior art multi-CPU system, the word CPU 1 is prohibited from accessing the common memory 3 and is kept in its waiting state at least while the byte CPU 2 is accessing the common memory 3 for data information of one word. The word "at least" means that the contention problem is "at least" avoided by the above stated technique. Actually, in the prior art multi-CPU system of FIG. 10, even the byte CPU 2 is prohibited from accessing the common memory 3 and is kept in its waiting state while the word CPU 1 is accessing the common memory 3. More specifically, when both the word CPU 1 and the byte CPU 2 access the common memory 3, access demand signals S1 and S2 from the respective CPUs are supplied to respective input terminals of an interlock circuit 20 which consists of a flip-flop circuit. A "NAND" result of output signals from the interlock circuit 20 allows either the word CPU 1 or the byte CPU 2 to get access to the common memory 3. Herein, the access demand signal S2 from the word CPU 1 is subjected to an "AND" operation with an inversion of a word access signal S3 which is outputted when the byte CPU 2 accesses for data information of one word, and the AND result is supplied to the interlock circuit 20. Hence, while the byte CPU 2 accesses the common memory 3 for the data information of one word, the access demand signal S2 from the word CPU 1 cannot be inputted to the interlock circuit 20. That is, while the byte CPU 2 continues accessing the common memory 3 for the second one byte, the word CPU 1 cannot access the common memory 3. Inverted signals of the outputs from the interlock circuit 20 and the respective access demand signals S1 and S2 are subjected to an AND operation to form respective waiting signals S4 and S5. By virtue of these waiting signals S4 and S5, while one CPU is accessing the common memory, the other CPU is kept in its waiting state. As was described above, this kind of multi-CPU system assures the data information of one word in the common memory 3 when the byte CPU 2 accesses that information.

However, in this kind of multi-CPU system, while one CPU is accessing a certain address, the other CPU is kept in its waiting state even if it requests access to another address. This results in longer information processing time.

Figure 11:
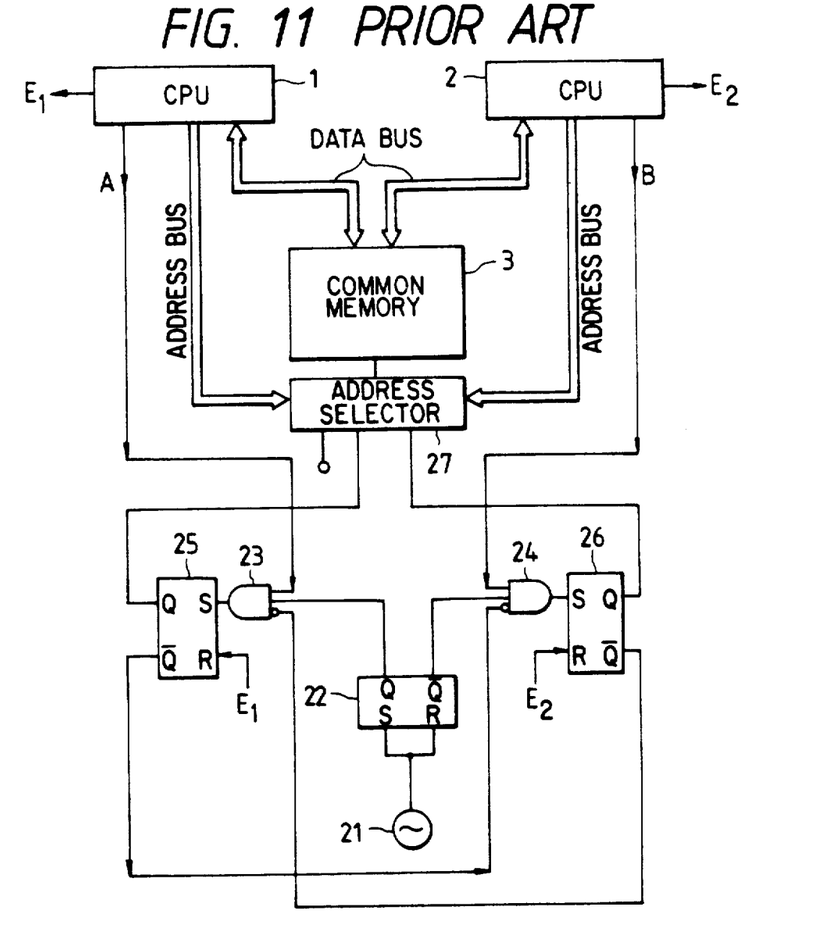
FIG. 11 is a circuit of another conventional system.

In FIG. 11, the multi-CPU system disclosed in Japanese Patent Application Laid-Open No. 245063/1985 is illustrated. The purpose of this prior art is to improve the problem of the prior art system of FIG. 10 which requires longer time in data transfer operations. In this multi-CPU system, time periods in which two CPUs 1 and 2 asynchronously access a memory 3 are alternately assigned to the two CPUs. The system allows the CPU 1, for example, to access the common memory 3 only during the period which is assigned to the CPU 1 to access the common memory 3. This multi-CPU system comprises: a pulse generator 21 which generates continuous pulse signals; a flip-flop 22 which is alternately set and reset by an output signal from the pulse generator 21, AND gates 23 and 24 which take "AND" operations between respective output signals from the flip-flop 22 and respective access demand signals A and B from the CPUs 1 and 2; flip-flops 25 and 26 which ar set by respective output signals from the AND gates 23 and 24; and an address selector 27 which allows one of the CPUs to access its designated address according to which of the flip-flops 25 and 26 is in its set condition. That is, if the access demand signals A and B are outputted from the respective CPUs 1 and 2 when one of outputs Q and $\overline{Q}$ of the flip-flop 22 which correspond to the respective CPUs 1 and 2 has a high-level value, one of the flip-flops 25 and 26 is set and the corresponding CPU 1 or 2 is allowed to access the designated address which is latched in the CPU 1 or 2. Herein the CPUs 1 and 2 have their address latches as peripheral circuits in order to latch the address to access. Moreover, the inverted output $\overline{Q}$ from each of flip-flops 25 and 26 is supplied to an "inhibition" terminal of the AND gate 23 or 24 which is connected to the other flip-flop 25 or 26 in order to inhibit one CPU from accessing the common memory 3 while the other CPU is accessing that. Furthermore, when one access has been completed, the flip-flops 25 and 26 are reset by respective notice signals E1 and E2 which are outputted from respective CPUs 1 and 2. In this multi-CPU system, since the waiting loss time occurs only when the CPU fails to access in the period assigned to that CPU, the data transfer time is shorter than the previous multi-CPU system. However, even in this multi-CPU system, while one CPU is accessing the common memory 3, the other CPU is kept in its waiting state even if the other CPU requests access to a different address. There still exists a problem of extra processing time.

Figure 12:
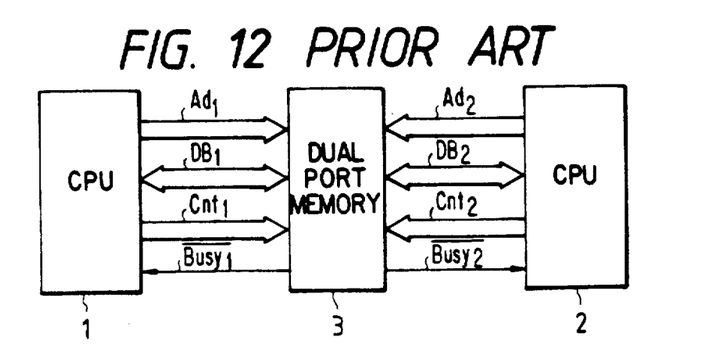
FIG. 12 is block diagram to illustrate still another conventional system.

Another technique is disclosed in the prior art multi-CPU system using a common memory which is a dual port memory comprising a "busy" terminal as a contention mediation terminal from which a mediation signal is outputted on the occasion of access contention in order to keep one CPU in its waiting state only while the other CPU is accessing the same address of the common memory. For this kind of common memory with the busy terminal, for example, MB8421 made by Fujitsu, Ltd. is employable. In this common memory for the multi-CPU system, when the addresses and chip selection signals ($\overline{CS}$) of the CPUs contend with each other, the common memory gives a priority to the CPU which accessed the common memory earlier, and it keeps the other CPU in its waiting state by keeping the corresponding busy signal ($\overline{Busy}$) at the low level. In FIG. 12, an example of a multi-CPU system utilizing this kind of common memory is illustrated. In this system, the data information is mutually transferred between CPUs 1 and 2 through a common memory 3. For the aforesaid CPUs 1 and 2, for example, Intel 8085 and 8086 type are employed. This type of CPU has a "Ready" terminal whose state is changed to the high level when it can access. By connecting this Ready terminal to the $\overline{Busy}$ terminal of the common memory 3, this system can easily realize the contention mediation to the common memory 3. That is, when the CPU 2 requests access to the common memory 3 while the CPU 1 is accessing the same address of that, the common memory 3 makes the Busy signal ($\overline{Busy_2}$) take the low level and thereby keeps the CPU 2 in its waiting state until completion of the access from the CPU 1. The CPU 2 can access the common memory 3 after the access from the CPU 1 has been completed and the busy signal ($\overline{Busy_2}$) has changed to the high level. As was described above, the contention mediation to the same address of the common memory 3 can be realized. Herein, a control signal (Cnt) in FIG. 12 includes signals such as a read signal ($\overline{RD}$), a write signal ($\overline{WT}$) and a chip selection signal ($\overline{CS}$).

However, heretofore, since the so called "one-chip microcomputer" such as an Intel 8031 type does not have the Ready terminal or an equivalent terminal, it cannot perform the above stated contention mediation to the common memory 3.

SUMMARY OF THE INVENTION

The present invention is intended to overcome the previously stated problems. An object of the present invention is, therefore, to provide a multi-CPU system which can realize contention mediation with respect to a common memory even in the case of using a so called one-chip microcomputer which does not have a control terminal.

A multi-CPU system according to the invention comprises the following elements between a CPU without a control terminal and a common memory: an access mediation latch for temporarily latching data information and corresponding address information in execution of reading or writing between a CPU and the common memory; and a timing control circuit for controlling the timing of data-reading or data-writing between the access mediation latch and the common memory in accordance with a mediation signal outputted from a contention mediation terminal of the common memory.

With the above constitution, in execution of data-reading or data-writing between the CPU without the control terminal and the common memory, the timing control circuit properly performs the timing control of data-reading and data-writing between the access mediation latch and the common memory in accordance with a contention state with reference to an output of a contention mediation terminal of the common memory, thereby performing the contention mediation to the common memory even in the case of using a so called one-chip microcomputer.

Other and further objects, features and advantages of the invention will appear more fully from the following description taken in connection with the accompanying drawings.

BRIEF DESCRIPTION OF THE DRAWINGS

FIGS. 2(a)-2(k) and FIGS. 3(a)-3(k) are timing charts to explain writing operations in the FIG. 1 embodiment;

FIGS. 4(a)-4(l) and FIGS. 5(a)-5(k) are timing charts to explain reading operations in the FIG. 1 embodiment;

FIGS. 7(a)-7(e) is a timing chart to explain an operation of the FIG. 1 embodiment;

FIGS. 9(a)-9(e) is a timing chart to explain an operation of the FIG. 8 embodiment;

DETAILED DESCRIPTION OF THE PREFERRED EMBODIMENTS

Embodiment 1

A multi-CPU system using a common memory according to the first embodiment of the invention will be described with reference to FIGS. 1 to 7. In this embodiment, a dual port memory with a contention mediation terminal is used as a common memory 3. On the contention mediation terminal is outputted a mediation signal which keeps CPUs without priority from accessing an address in the common memory while one CPU is actually accessing the same address. Data information is mutually transferred between a CPU 1 of a type so called "one-chip microcomputer" which does not have a "Ready" terminal or the like and a CPU 2 which has the "Ready" terminal through the common memory 3. Mediation of contention is required between the CPU 1 and the CPU 2 when data transfer is executed between the CPU 1 and the common memory 3. In order to attain this contention mediation, the multi-CPU system comprises: an access mediation latch for latching data information to be transferred (read/write) between the CPU 1 and the common memory 3 and a corresponding address information; and a timing control circuit 18 for controlling timing of data-reading and data-writing between the access mediation latch and the common memory 3 in accordance with a mediation signal outputted from a busy terminal $\overline{Busy_1}$ which is a contention mediation terminal of the common memory 3. The access mediation latch comprises a latch 4 for latching the address in the common memory 3 to be accessed with the data information is transferred between the common memory 3 and the CPU 1, D-Flip-Flop 5 (hereinafter called D-FF in short) with three state output for temporarily latching the data information to be written into the common memory 3, and a D-FF 6 for temporarily latching the data information read from the common memory 3. The timing control circuit 18 comprises all negative logic circuits of "AND" circuits 7 and 8, a "NOR" circuit 9, "OR" circuits 10 to 14; resistors R1 and R2, and capacitors C1 and C2. And, it keeps the data transfer between the D-FF 5 or 6 and the common memory 3 in its waiting state till the "Busy" signal ($\overline{Busy_1}$) changes to the state without contention, when a read signal ($\overline{RD}$) or a write signal ($\overline{WT}$) is outputted from the CPU 1 and is in contention with the CPU 2 (the CPU 2 has the access priority).

Hereinafter the operation of this embodiment will be explained. Firstly, an explanation will be made with reference to FIG. 2 for the case in which the data transfer from the CPU 1 to the common memory 3 is not in contention with the CPU 2 or it has the access priority even if it is in concurrence with the CPU 2. When the CPU 1 accesses the common memory 3, a chip selection signal $\overline{CS}$ and the write signal $\overline{WT}$ of the CPU 1 change to the low level as shown in FIGS. 2(b) and 2(c), respectively; an ANDed output $\overline{COWT}$ of the AND circuit 8 between the chip selection signal $\overline{CS}$ and the write signal $\overline{WT}$ changes to the low level as shown in FIG. 2(e); and an output CORW of the NOR circuit 9 changes to the high level as shown in FIG. 2(f). The address into which the data information is to be written is latched in the latch 4 by using the leading edge of the output CORW of the NOR circuit 9 as shown in FIG. 2(h). The data information itself to be written is latched in the D-FF 5 by using the leading edge of the output $\overline{COWT}$ of the AND circuit 8.

Figures 2A, 2K:
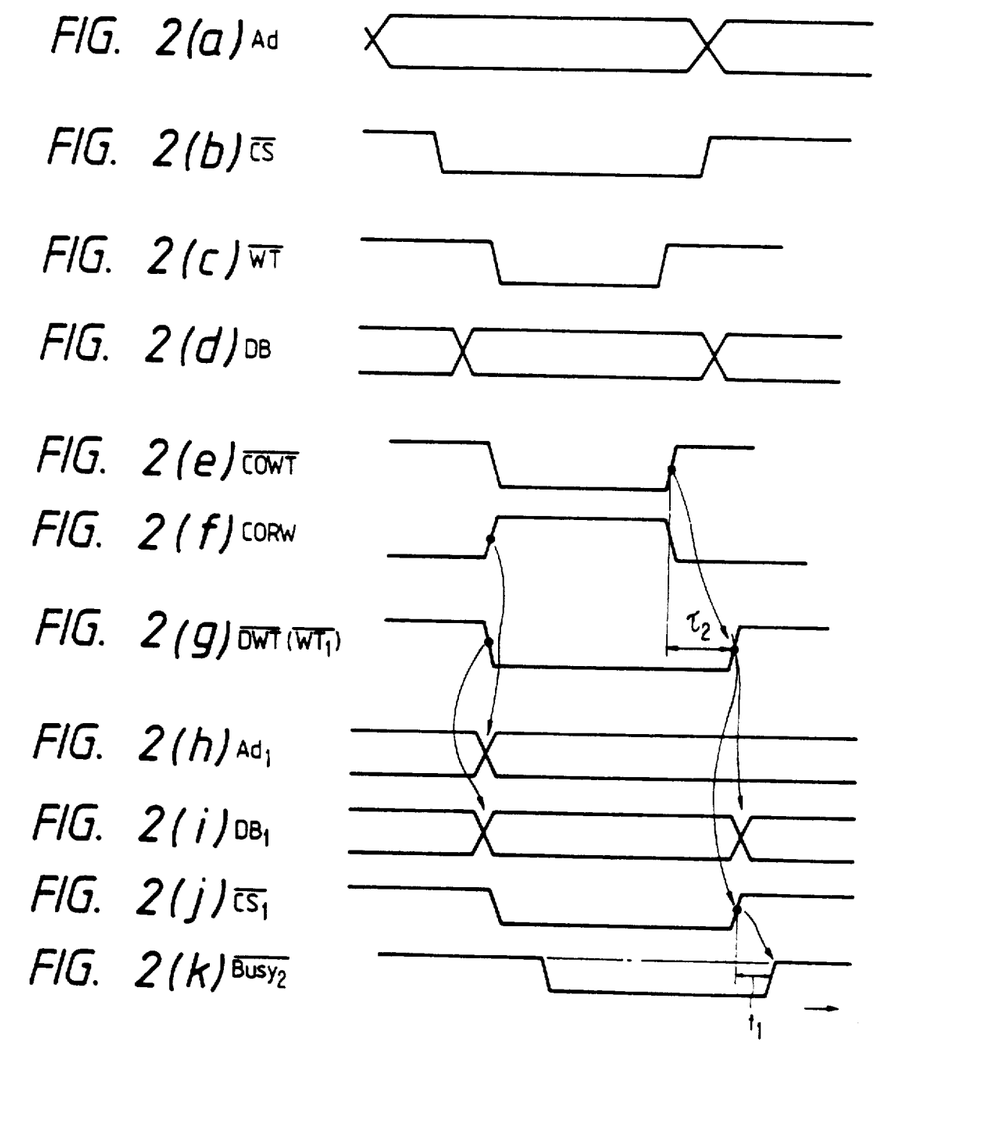

Next, an actual writing process to the common memory 3 will be described. This process is performed by using an output $\overline{DWT}$ of the OR circuit 13 in FIG. 2(g). In this case of description, since there is no contention between the CPUs 1 and 2 or the CPU 1 has the priority to access the common memory 3, the Busy signal ($\overline{Busy_1}$) is in the high level, and hence the output $\overline{DWT}$ of the OR circuit 13 changes to the low level at the moment when the output $\overline{COWT}$ of the AND circuit 8 changes to the low level. Consequently, voltages of a write terminal $\overline{WT_1}$ of the common memory 3 and an output enable $\overline{OE}$ of the D-FF 5, both terminals being supplied with the output $\overline{WT_1}$ of the OR circuit 13, changes to the low level. At the same time, since an output of the OR circuit 14 to which the output $\overline{DWT}$ of the OR circuit 13 is supplied as one input signal, changes to the low level and the chip selection terminal $\overline{CS_1}$ of the common memory 3 to which the output of the OR circuit 14 is supplied, changes to the low level as shown in FIG. 2(j), the writing operation to the common memory 3 becomes possible at the moment when the write signal $\overline{WT}$ is inputted from the CPU 1. The output $\overline{COWT}$ of the AND circuit 8 changes to the high level when the write signal $\overline{WT}$ of the CPU 1 changes to the high level, so that the data information itself is latched in the D-FF 5. At this moment, since the busy signal $\overline{Busy_1}$ and the output of the AND circuit 8 changes to the high level, both being inputted to the OR circuit 12, the output of the OR circuit 12 changes to the high level. However, the output signal $\overline{DWT}$ of the OR circuit 13 is kept to the low level during a period $\tau_2$ which is the time constant determined by the resistor $R_2$ and the capacitor $C_2$. The actual writing of the data information to the common memory 3 is executed by means of the output signal $\overline{DWT}$ of the OR circuit 13 which is changed to the high level after the delay time of $\tau_2$. Herein, the time constant $\tau_2$ is set to the period required to write the data information into the common memory 3. In the case where there occurs access from the CPU 2 to the common memory 3 while the memory 3 is under the writing operation from the CPU 1, the voltage of the busy terminal $\overline{Busy_2}$ of the common memory 3 which is directly connected to the ready terminal of the CPU 2 changes to the low level and thereby the CPU 2 is kept in its waiting state until the writing operation from the CPU 1 has been completed. In the case where there is no contention, the busy signal $\overline{Busy_2}$ is kept at the high level as an one-dot chain line shown in FIG. 2(k). The period $t_1$ in FIG. 2(k) is a delay time which is taken to cancel the contention state of the common memory 3.

Figures 3A, 3K:
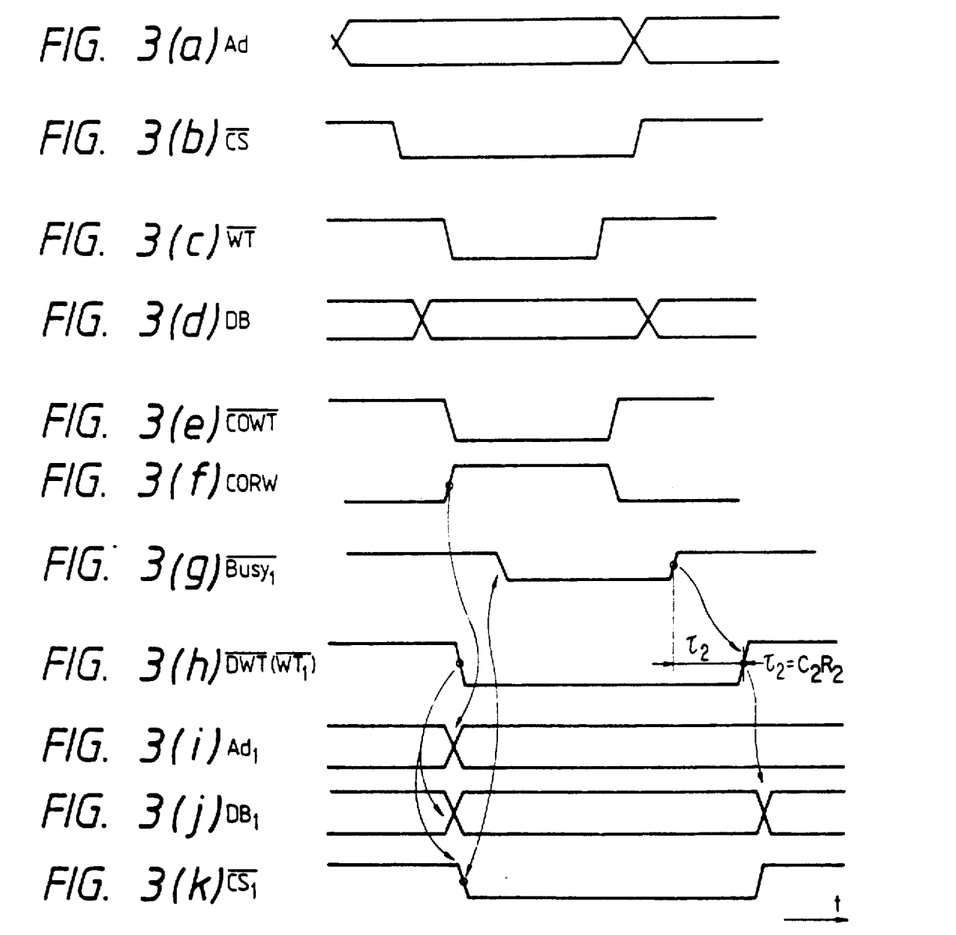

Hereinafter, there will be explained another case where the CPUs 1 and 2 are in contention and the CPU 2 has the access priority to access the common memory 3. In this case, since the busy signal $\overline{Busy_1}$ changes to the low level as illustrated in FIG. 3(g) with the address information having been read from the latch 4 into the common memory 3, even when the output $\overline{COWT}$ of the AND circuit 8 changes to the high level as illustrated in FIG. 3(e) the output $\overline{DWT}$ of the OR circuit 13 does not change to the high level. In consequence, the CPU 1 is kept from writing the data information until the access from the CPU 2 has been completed. When the busy signal $\overline{Busy_1}$ changes to the high level as illustrated in FIG. 3(g), the data information which has been latched in the D-FF 5 is written into the common memory 3 in response to the rise of the output $\overline{DWT}$ of the OR circuit 13 which occurs after the delay time $\tau_2$ in the same manner as described above.

Figures 4A, 4L:
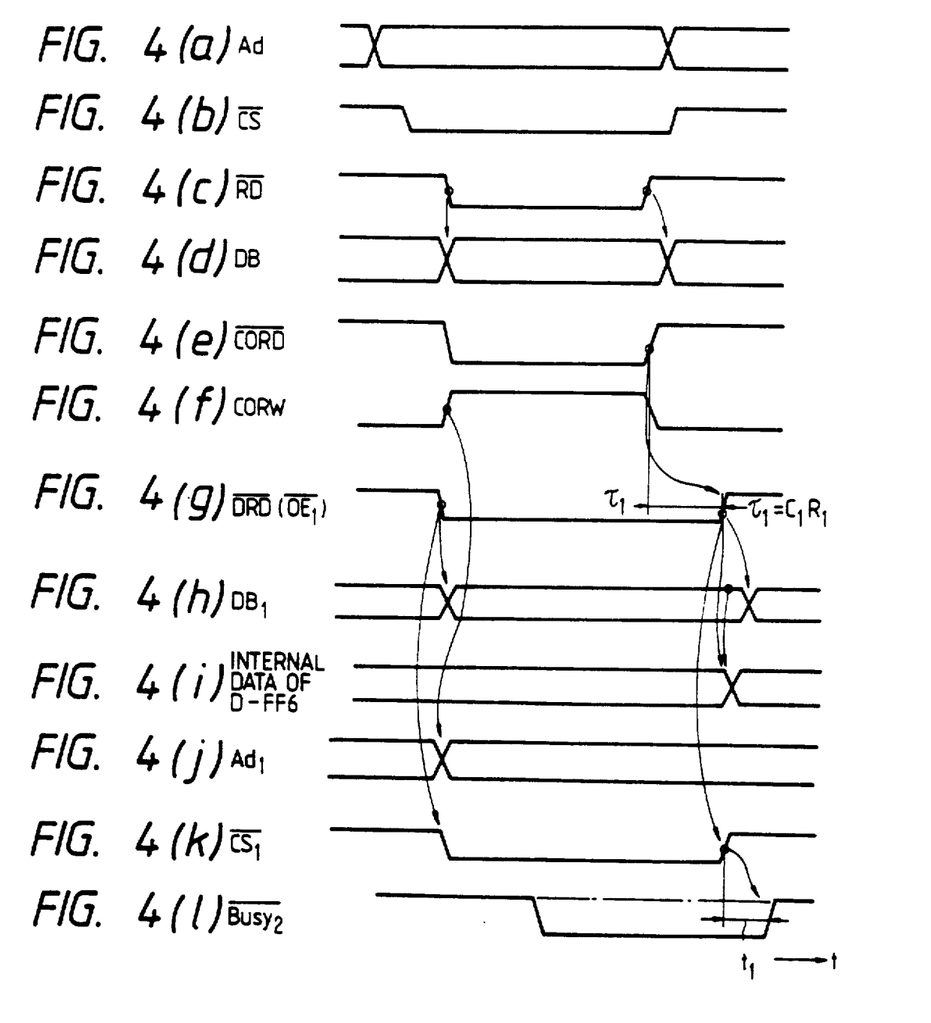

Hereinafter, the operation of reading out the data information from the common memory 3 will be described. Firstly, there will be described with reference to FIG. 4 the case where there is no contention or even in the case of contention the CPU 1 has the access priority. In reading out the data information from the common memory 3, the read signal $\overline{RD}$ and the ship selection signal $\overline{CS}$ from the CPU 1 change to the low level as illustrated in FIGS. 4(c) and 4(b), respectively, and hence the output $\overline{CORD}$ of the AND circuit 7 changes to the low level as illustrated in FIG. 4(e). At the same time, since the output CORW of the NOR circuit 9 changes to the high level as illustrated in FIG. 4(f), the address of the data information to be read out is latched in the latch 4. Since the output signal $\overline{CORD}$ of the AND circuit 7 is supplied to an output enable terminal $\overline{OE}$ of the D-FF 6 in which the read-out data information is latched, the data latched in the D-FF 6 is read out to the CPU 1 in response to the output $\overline{CORD}$ of the AND circuit 7. Because the D-FF 6 latches the data information which was read out at the preceding access to the common memory 3, the data information read out at the preceding access is supplied to the CPU 1 in the above-stated reading operation. As a result, the data information is read from the common memory 3 to the CPU 1 by accessing to the common memory 3 two times. When the output $\overline{CORD}$ of the AND circuit 7 changes to the high level as illustrated in FIG. 4(e), the output $\overline{DRD}$ of the OR circuit 11 changes to the high level after a delay time $\tau_1$ which is a time constant determined by the resistor R1 and the capacitor C1 as illustrated in FIG. 4(g). In response to the input of the signal $\overline{ORD}$ to a clock terminal CK of the D-FF 6, the data information is written into the D-FF 6 from the common memory 3. Herein, the time constant $\tau_1$ is set to the period which is taken to read data from the common memory 3. The output signal $\overline{DRD}$ of the OR circuit 11 is supplied to the output enable terminal $\overline{OE_1}$ of the common memory 3 and the output signal of the OR circuit 14 is inputted to the chip selection terminal $\overline{CS_1}$. When the contention with the CPU 2 occurs, the busy terminal $\overline{Busy_2}$ changes to the low level as illustrated in FIG. 4(l) in the same manner as in the foregoing writing operation.

Figure 5A:
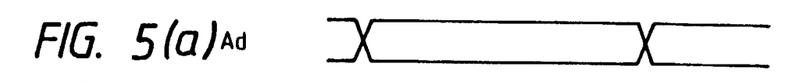
Figure 5B:
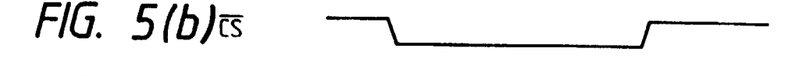
Figure 5C:
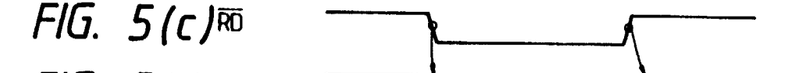
Figure 5D:
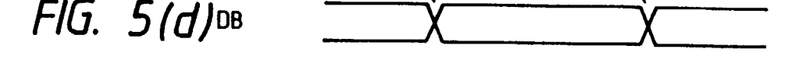
Figure 5E:
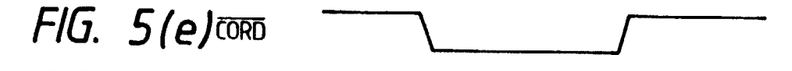
Figure 5F:
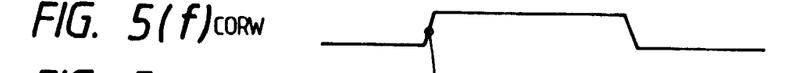
Figure 5G:
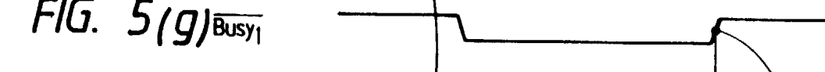
Figure 5H:
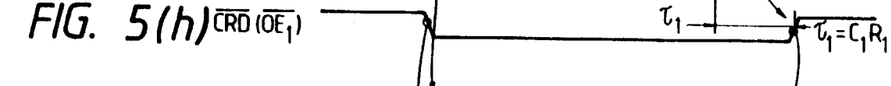
Figure 5I:
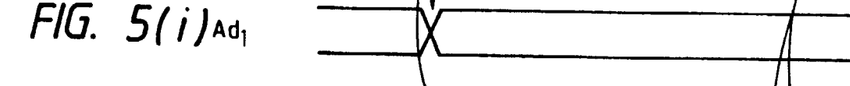
Figure 5J:
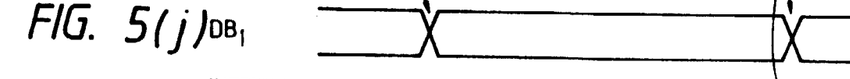
Figure 5K:
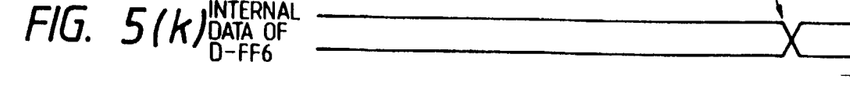

On the other hand, in the case of the contention with the CPU 2 which has the access priority, the data information is read from the common memory 3 and sent to the D-FF 6 after the period $\tau_1$ from the rise of the busy signal $\overline{Busy_1}$ as illustrated in FIG. 5(g).

As was described in the foregoing pages, with the first embodiment of the invention, in order to perform the data transfer between the common memory 3 and the CPU 1 without the ready terminal the aforesaid timing control circuit 18 controls the timing of data transfer between the latch 4 and the common memory 3 in accordance with the access contention with reference to the output signal from the busy terminal of the common memory 3. The contention mediation of the common memory 3 can be therefore realized even in the case where a so called "one chip microcomputer" is employed.

Figure 6:
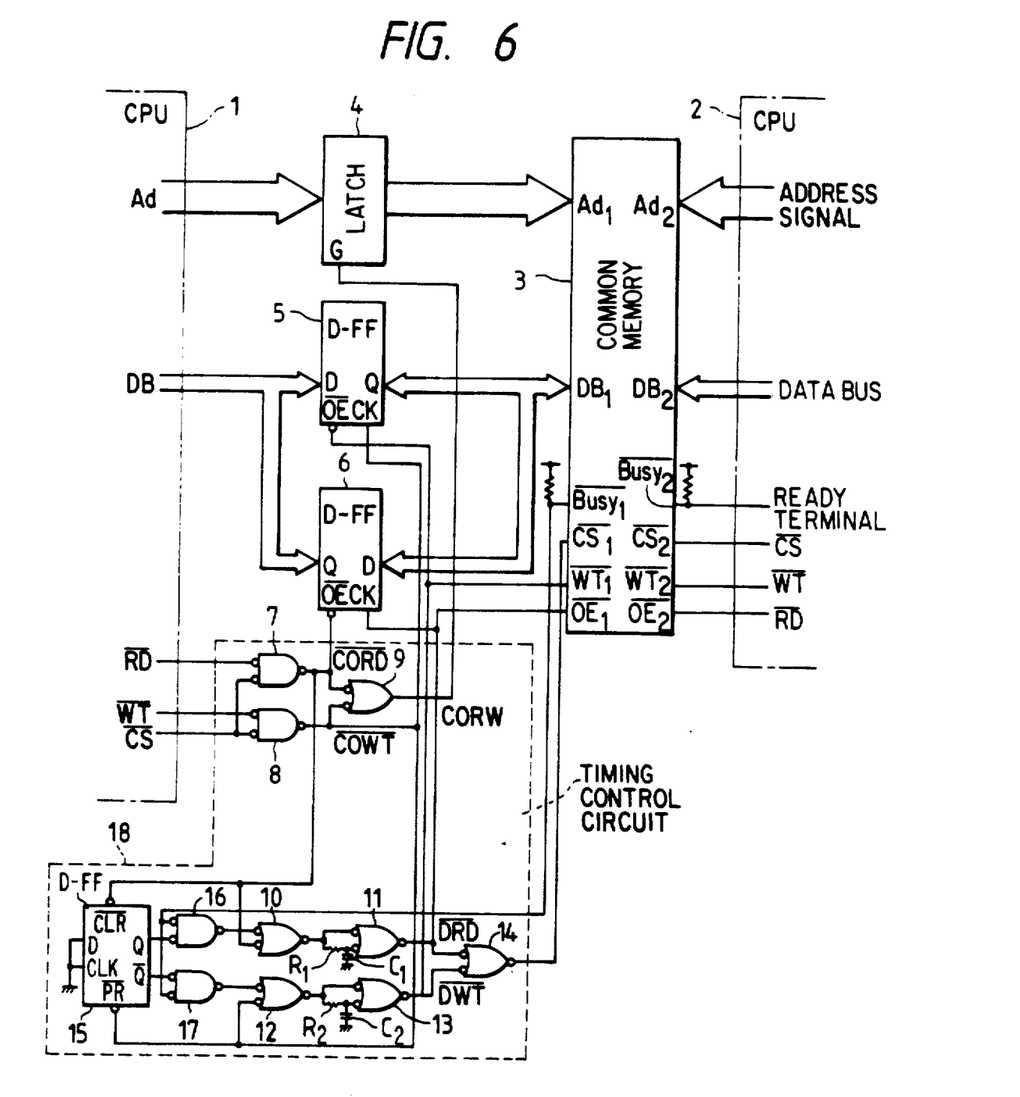
FIG. 6 is a circuit to illustrate another timing control circuit.

A modified circuit illustrated in FIG. 6 can realize the same result. The timing control circuit 18 comprises a D-FF 15 which is preset by each output signal $\overline{COWT}$ of the AND circuit 8 and cleared by the output $\overline{CORD}$ of the AND circuit 7. AND operations between the busy signal $\overline{Busy_1}$ and respective output signals Q and $\overline{Q}$ from the D-FF 15 are executed in the respective AND circuits 16 and 17, and ANDed results are supplied to respective OR circuits 10 and 12. In the data-reading process or data-writing process of the CPU 1, the busy signal $\overline{Busy_1}$ is only supplied to the corresponding one of the reading and writing side of the succeeding circuit. The output timing of the AND circuits 16 and 17 are the same as that of the busy signal $\overline{Busy_1}$. It is therefore understood that the operation of this modification is the same as that of the former embodiment of FIG. 1 except that the busy signal $\overline{Busy_1}$ is replaced by the output signal of AND circuits 16 and 17.

Above description is made for the case where the contention mediation to the common memory 3 is performed between the CPU 1 without the control terminal (e.g., ready terminal) and the CPU 2 with the control terminal. However, it is noted that the invention is also applied to the case where the contention mediation is performed between the plural CPUs without the control terminal. In this case, the timing control circuit 18 is equipped between each CPU without the control terminal and the common memory 3.

Embodiment 2

Figure 8:
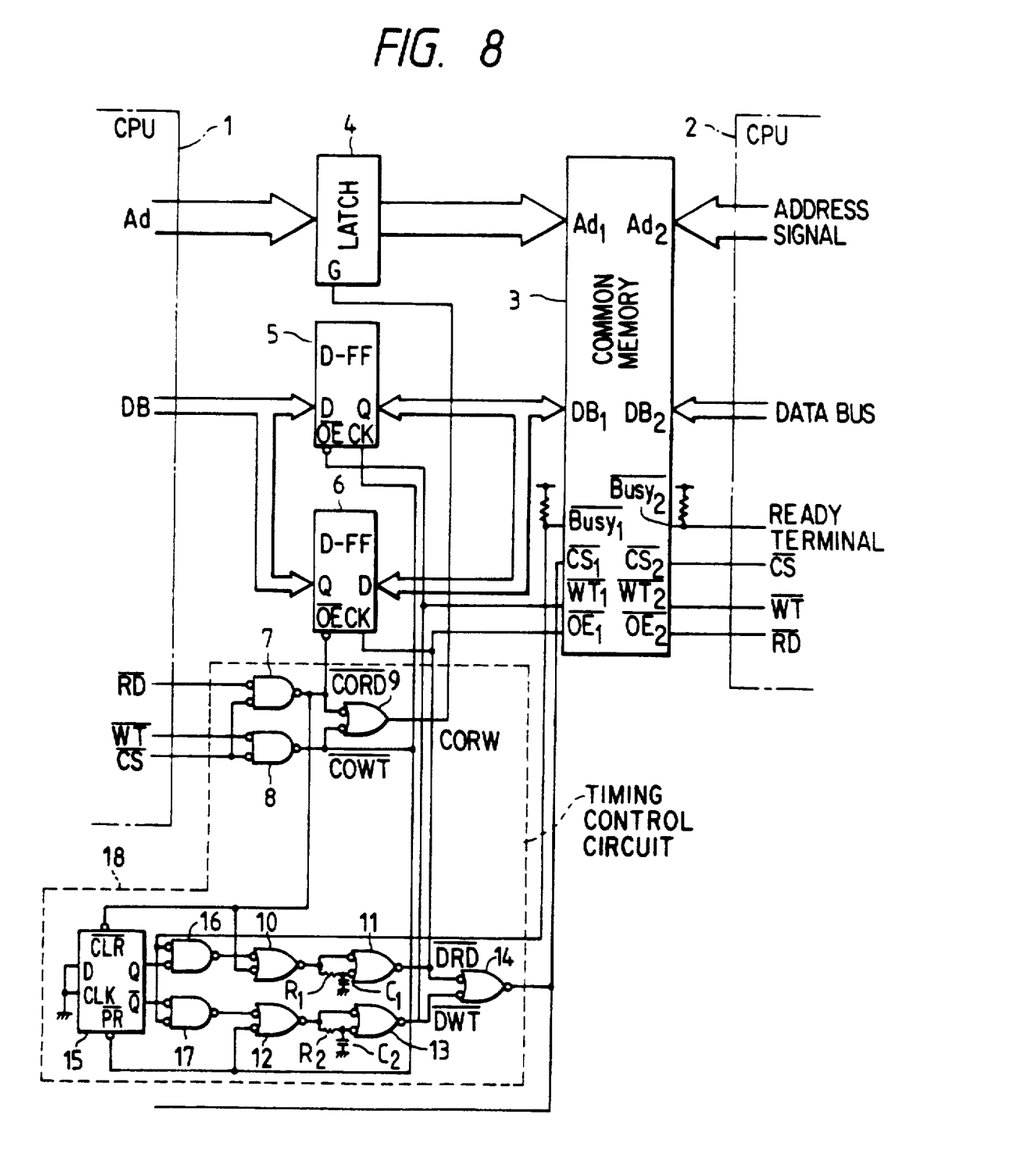
FIG. 8 is a circuit of a multi-CPU system according to another embodiment of the invention.

A multi-CPU system using a common memory according to another embodiment of the invention is illustrated in FIGS. 8 and 9. Following are sentences of a program for writing operation from the CPU 1 to the common memory 3 of the first embodiment. This program is for the case where the Intel 8031 type is employed.

| MOV  | A, #DATA1    | step 1 |
| MOV  | DPTR, #Add.1 | step 2 |
| MOVX | @DPTR, A     | step 3 |
| MOV  | A, #DATA2    | step 4 |
| MOV  | DPTR, #Add.2 | step 5 |
| MOVX | @DPTR, A     | step 6 |

That is, the program operates as follows: setting data DATA1 to be written in the step 1; setting an address Add.1 into which the data is to be written in the step 2; writing the data DATA1 into the address Add.1 in the step 3; setting next data DATA2 to be written in the step 4; setting an address Add.2 into which the data DATA2 is to be written in the step 5; and writing the data DATA2 to the address Add.2 in the step 6.

Figure 1:
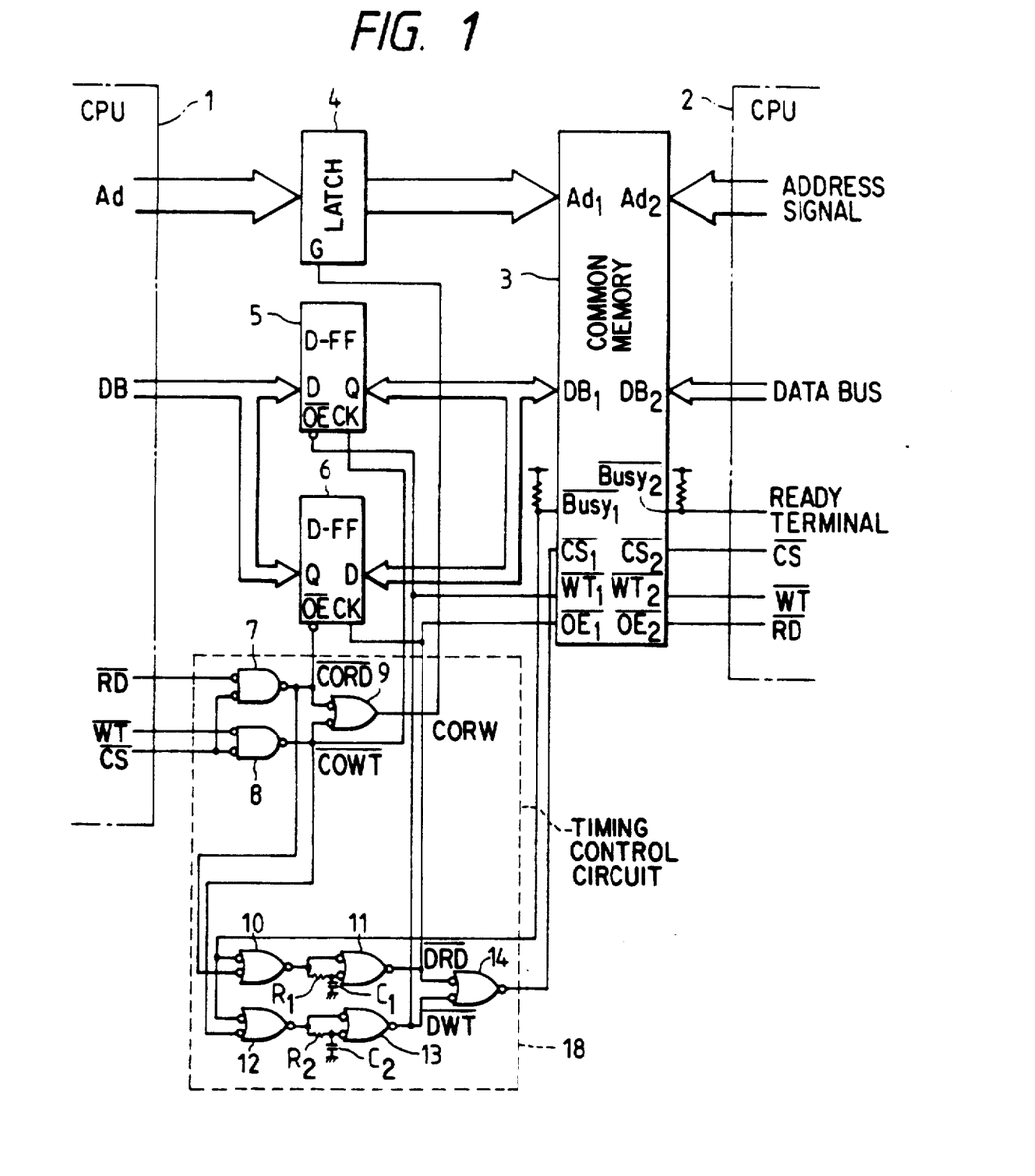
FIG. 1 is a circuit of a multi-CPU system according to an embodiment of the present invention.
Figure 7A:
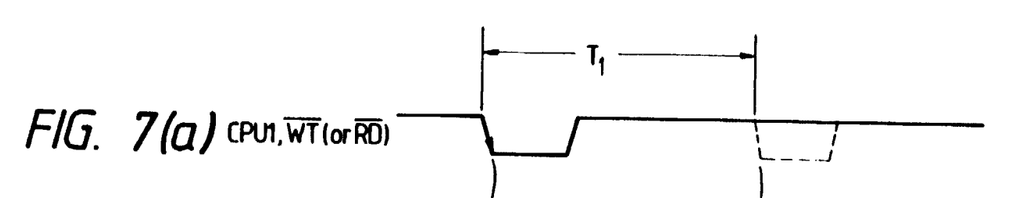
Figure 7B:
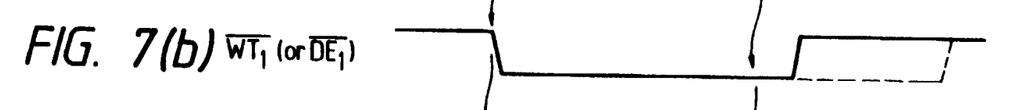
Figure 7C:
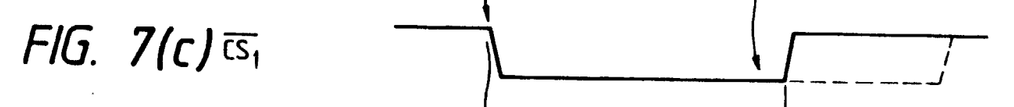
Figure 7D:
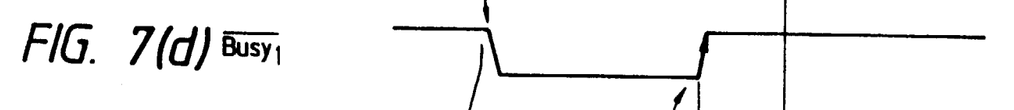
Figure 7E:
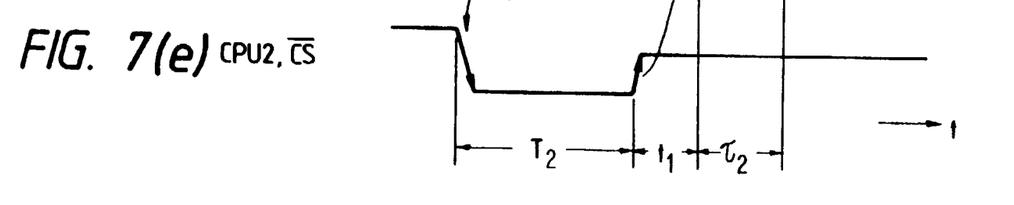

In the first embodiment of FIG. 1, whose program is listed above, as shown in FIGS. 7(a) and 7(e), in the case where the CPU 2 accesses an address of the common memory 3 before the CPU 1 executes writing into the same address in the step 3, the busy output $\overline{Busy_1}$ of the common memory 3 changes to the low level. When the access from the CPU 1 has been completed, the signal Busy, returns to the high level after a delay time $t_1$. Then, by means of the aforesaid timing control circuit 18, the outputs of the write terminal $\overline{WT_1}$ and the chip selection terminal $\overline{CS_1}$ are returned to the high level after the delay time $\tau_2$, i.e., the period required to write data into the common memory 3.

However, if the next writing operation begins before the voltages of the write terminal $\overline{WT_1}$, etc. return to the high level in the step 6 as illustrated with a broken line in FIG. 7(a), the write terminal $\overline{WT_1}$ and the chip selection terminal $\overline{CS_1}$ are kept in the low level as illustrated with respective broken lines in FIGS. 7(b) and 7(c) and, with this situation, the CPU 1 moves to the writing process of the next data DATA2. This means that the CPU 1 cannot write the preceding data information DATA1. The condition in which such a problem will happen is given by: $T_2+t_1-\tau_2>T_1$. Usually, various CPUs may be employed as the CPU 2. If a CPU with the long access time $T_2$ is used as the CPU 2, the above defined formula is fulfilled and hence the writing operation from the micro processor 1 cannot be guaranteed. The same problem may occur in the reading process, too.

In the second embodiment shown in FIG. 8, therefore, the CPU 1 detects completion of transfer of the data information whose corresponding address information is latched in the latch 4 to the common memory 3 by using the output signal $\overline{CS_1}$ of the OR circuit 14 in the timing control circuit 18, and the next access is prohibited until the above-stated writing or reading has been completed. To this end, there equipped is a control means which is constructed in a software-like manner in logic circuits of the CPU 1 and has functions of detecting the completion of writing through supplying the output signal $\overline{CS_1}$ of the OR circuit 14 in the timing control circuit 18 to an input port Port1 of the CPU 1, and prohibiting the next access until the completion of writing or reading of the data with the address latched in the latch 4 into or from the common memory 3.

Following are sentences of a program for writing operation from the CPU 1 to the common memory 3 of this embodiment.

| MOV | A, #DATA1 | step 1 |
| MOV | DPTR, #Add.1 | step 2 |
| MOVX | @DPTR, A | step 3 |
| MOV | A, #DATA2 | step 4 |
| MOV | DPTR, #Add.2 | step 5 |
| JNB | Port1, $ | step 6 |
| MOVX | @DPTR, A | step 7 |

In this program, the sentences from the step 1 to the step 5 are the same as those of the first embodiment. In the step 6 the access is held until the completion of the preceding data writing (Add.). In the step 7 the data DATA2 is written into the address Add.2.

Figure 9A:
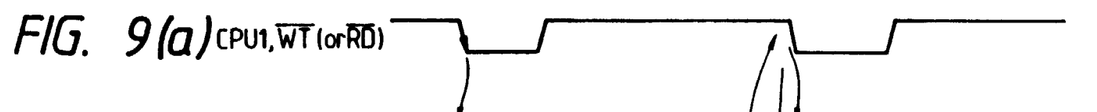
Figure 9B:
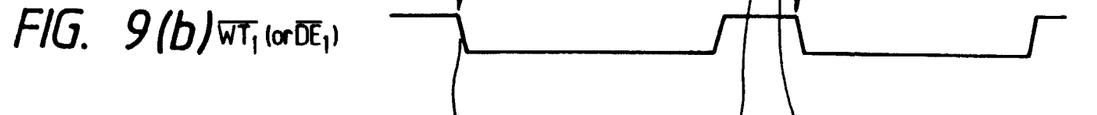
Figure 9C:
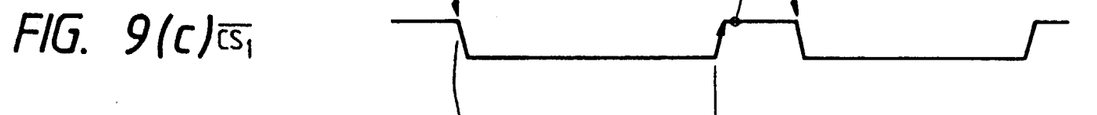
Figures 9D, 9E:
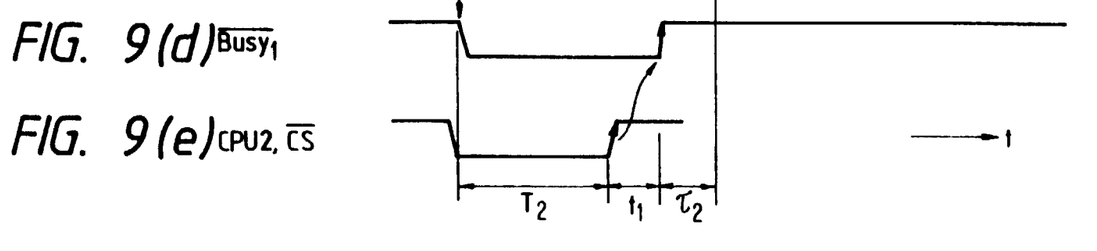

With the program, the CPU 1 detects the completion of the preceding access (step 3) before starting the next access (step 7), that is, detects the change of the output $\overline{CS_1}$ of the OR circuit 14 to the high level (FIG. 9(c)) through the input signal state of the input port Port 1 to which the output $\overline{CS_1}$ is inputted, and executes, as shown in FIG. 9(a), the next access after the completion of writing. By virtue of this constitution, the problem of the first embodiment, that is, the access failure of the DATA1, can be solved.

As described in the foregoing pages, with the multi-CPU system of the present invention, the contention mediation to the common memory can be attained even in the case of employing the so called one-chip microcomputer.

We claim:

1. A multi-CPU system using a common memory, wherein data information is mutually transferred between a plurality of CPUs each utilizing a port for performing accessing of said memory, said system comprising:
   a first CPU with a control terminal, which halts said first CPU's access to said common memory in response to a mediation signal provided to said control terminal;
   a second CPU without any such control terminal;
   said common memory for outputting said mediation signal to CPUs without priority when a same address of said common memory is attempted to be accessed by a plurality of CPUs;
   an access mediation latch connected to both said second CPU and said common memory, for temporarily latching data information to be transferred between said second CPU and said common memory and a corresponding address information; and
   a timing control circuit connected to both said second CPU and said common memory, for controlling timing of data transfer between said access mediation latch and said common memory in accordance with said mediation signal.

2. A multi-CPU system as claimed in claim 1, wherein said second CPU comprises control means for detecting, from an output signal of said timing control circuit, if transfer of said data information, said address information corresponding to said data information which is latched in said access mediation latch, has been completed, and prohibiting next access to said common memory until completion of said transfer.

3. A multi-CPU system using a common memory, wherein data information is mutually transferred between a plurality of CPUs each utilizing a port for performing accessing of said memory, said system comprising:
   said plurality of CPUs being of a non-controllable type in that each said CPU does not contain a control terminal which can be used for halting said CPU's access to said common memory;
   said common memory for outputting a mediation signal to said CPUs without priority when a same address of said common memory is attempted to be accessed by a plurality of said CPUs;
   a separate access mediation latch connected between each of said CPUs and said common memory, for temporarily latching data information to be transferred between said CPU and said common memory and a corresponding address information; and
   a separate timing control circuit connected between each of said CPUs and said common memory, for controlling timing of data transfer between said access mediation latch and said common memory in accordance with said mediation signal.

4. A multi-CPU system as claimed in claim 3, wherein said CPU comprises control means for detecting, from the output signal of said timing control circuit, if transfer of said data information, said address information corresponding to said data information which is latched in said access mediation latch, has been completed, and prohibiting next access to said common memory until completion of said transfer.

* * * * *